United States Patent Office.

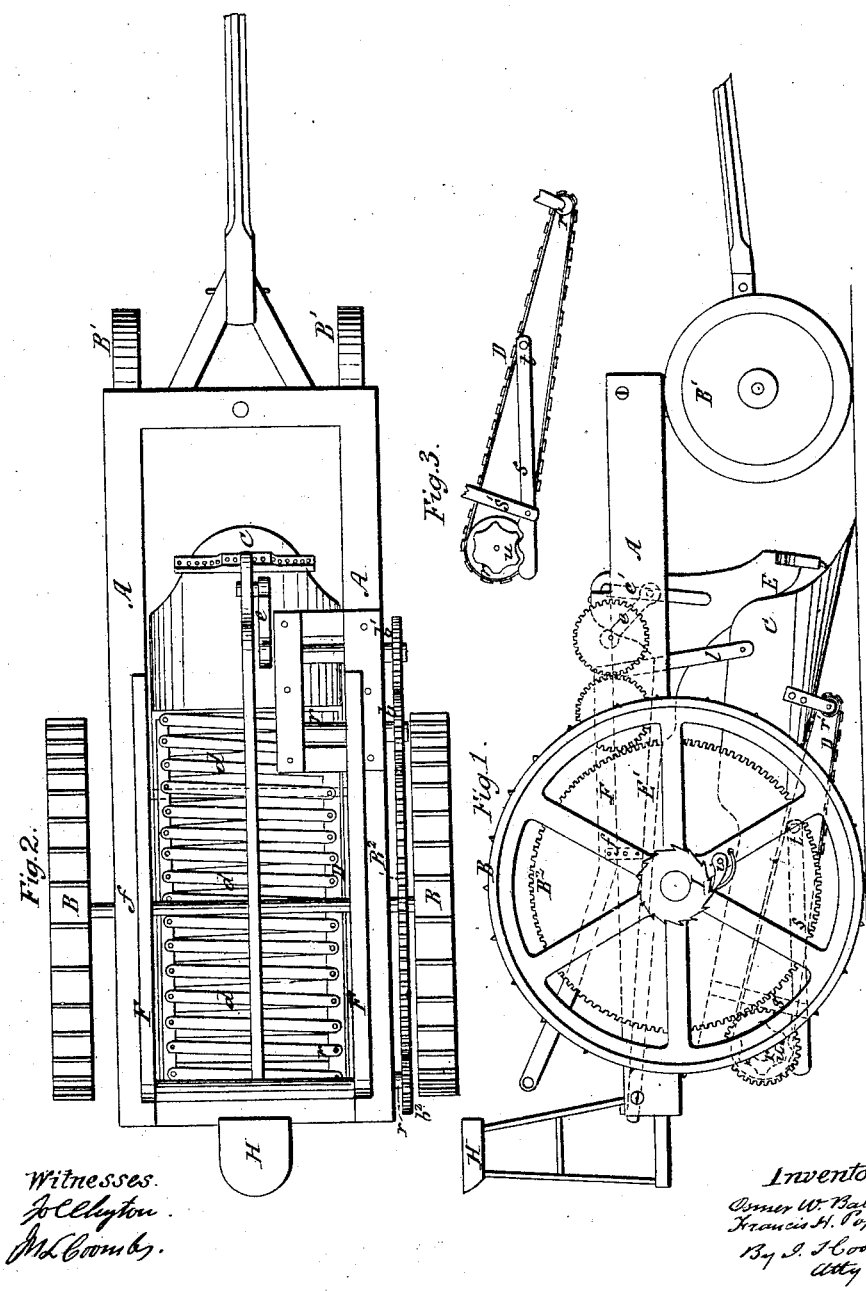

OSMER W. BALDWIN AND FRANCIS H. POPE, OF GREENFIELD, OHIO.

*Letters Patent No. 63,604, dated April 9, 1867.*

IMPROVEMENT IN POTATO-DIGGING MACHINES.

*The Schedule referred to in these Letters Patent and making part of the same.*

TO ALL WHOM IT MAY CONCERN:

Be it known that we, OSMER W. BALDWIN and FRANCIS H. POPE, both of Greenfield, in the county of Highland, and State of Ohio, have invented a new and useful Improvement in Potato-Digging Machines; and we do hereby declare that the following is a full, clear, and exact description thereof, reference being had to the accompanying drawings, and to the letters of reference marked thereon, in which—

Figure 1 is a side elevation of our machine.

Figure 2 is a plan view of the same; and

Figure 3 is a detached view of the "shaker."

Like letters refer to the same parts in all the figures.

A is the main frame, B B the main driving-wheels, and $B^1$ $B^1$ truck-wheels, supporting the forward end of the main frame, being pivoted thereto by a bolt, $a$, which allows said truck-wheels to turn to the right or left independently of the frame. C is an iron shovel, or digger, with upper surface concave and lower surface convex, and its front end rounded, as shown in fig. 2. D is the separator or screen, consisting of an endless apron, composed of slats $d$ $d$, attached to belts $D'$ $D'$, and revolving on rollers $r$ and $r'$. S is the "shaker," consisting of a frame, pivoted on each side to an arm, $S'$, projecting downward from the side-bar of the digger, and having a cross-bar, $t$, lying under the upper portion of the endless apron D. This frame is agitated by means of cams $u$ on each end of roller $r$, so as to shake the endless slatted apron, and cause the dirt more effectually to fall through it. F is the rock-frame, which supports the forward end of the digger, being attached thereto by link-bars on either side, one of which is shown at $l$, fig. 1. The side-bars of said frame F are in the form of rockers, as will be seen by dotted lines in fig. 1; and being pivoted to the main frame at $f$, pressure applied to its rear end will cause it to rock and elevate the front end of the digger. H is the driver's seat, so located that his feet will rest on the rear cross-bar of the frame F; and by the pressure of his feet he can elevate or depress the digger at pleasure. The digger has two side-bars running back to roller $r$, to which said side-bars are attached, and with which they turn as the digger is elevated or depressed. Roller $r'$ being attached to the digger, the separator must rise and fall with the digger. $B^2$ is a large cog-wheel, mounted on the axle of the main driving-wheels and rotating with them. $b^2$ is a pinion-wheel on the end of roller $r$, and being rotated by large cog-wheel $B^2$, revolves the separator with considerable rapidity. Pinion-wheel $b$, gearing into large cog-wheel $B^2$, serves to convey a rotary motion to pinion-wheel $b^1$. E is a rake, rigidly attached to a pitman-shaft, $E'$, the rear end of which rests in a recess in the centre of the rear cross-beam of the main frame, and slides therein. In the rake-head is a vertical slot, $e'$, which the pin of crank $e$ enters, said crank being on the shaft of pinion-wheel $b^1$ and rotating therewith. As the crank $e$ makes its under or back stroke, it carries the rake back over the bottom of the digger to the separator, throwing the contents of the digger on to the separator, which carries the potatoes back to the rear of the machine, while the dirt falls through the interstices of the separator. The crank revolves with such rapidity that the rake is carried forward, ready for another back stroke, while the digger is filling. The driving-wheels B are set loosely on their axle, so as to turn independently of it, except when the wheels and axle are made to rotate together by means of ratchet-wheels I and pawls $i$, there being a ratchet-wheel and pawl at each end of the axle. When the machine moves forward the axle revolves, setting all the machinery in motion; but when it backs the wheels revolve independently of the axle, and neither the rake nor the separator is put in motion.

What we claim as our invention, and desire to secure by Letters Patent, is—

1. The concave digger, in combination with the rotating, endless slatted apron or separator, all constructed and operating substantially as described.

2. The rotating separator, in combination with the digger and shaker, all constructed, arranged, and operating substantially as described.

3. The slotted rake E, in combination with the digger, and the mechanism by which the peculiar motion of said rake is given to it by means of the driving-wheels.

4. We also claim hinging the digger, the separator, and the shaker all upon one pivot at the rear, so that all may be elevated and depressed together, substantially as shown and described.

5. We also claim the rock-frame F, in combination with the digger, for the purpose of elevating and depressing the latter, substantially as described.

6. In combination with rock-frame F, for elevating and depressing the digger, we claim a driver's seat, so located that the driver can operate said frame by his feet, substantially as described.

OSMER W. BALDWIN.
FRANCIS H. POPE.

Witnesses:
F. W. PIERSON,
O. J. BALDWIN.